United States Patent
Putzig

(10) Patent No.: US 7,226,888 B2
(45) Date of Patent: Jun. 5, 2007

(54) COMPOSITION COMPRISING TITANIUM AND ALUMINIUM AND POLYESTER PRODUCTION

(75) Inventor: Donald Edward Putzig, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 270 days.

(21) Appl. No.: 10/912,866

(22) Filed: Aug. 6, 2004

(65) Prior Publication Data

US 2006/0030691 A1 Feb. 9, 2006

(51) Int. Cl.
*B01J 31/00* (2006.01)
(52) U.S. Cl. ........................ 502/150; 528/279
(58) Field of Classification Search ........... 502/150; 528/279

See application file for complete search history.

(56) References Cited

U.S. PATENT DOCUMENTS

| | | | |
|---|---|---|---|
| 6,080,834 A | 6/2000 | Putzig et al. | |
| 6,156,867 A | 12/2000 | Aoyama et al. | |
| 6,255,441 B1 | 7/2001 | Putzig et al. | |
| 6,346,070 B1 | 2/2002 | Ohmatsuzawa et al. | |
| 6,372,929 B1 | 4/2002 | Ridland et al. | |
| 2005/0215425 A1* | 9/2005 | Clair et al. | 502/150 |
| 2005/0215426 A1* | 9/2005 | Putzig | 502/150 |
| 2005/0215809 A1* | 9/2005 | Putzig | 558/102 |

FOREIGN PATENT DOCUMENTS

| | | |
|---|---|---|
| JP | 2000-143789 A | 5/2000 |
| JP | 2003-305537 A | 10/2003 |
| JP | 2003-306537 A | 10/2003 |
| JP | 2003-306538 A | 10/2003 |
| JP | 2005126449 | 5/2005 |
| WO | WO9928033 A * | 6/1999 |
| WO | WO 2004/050239 A2 | 6/2004 |
| WO | WO 2005-097321 A1 | 10/2005 |

* cited by examiner

*Primary Examiner*—Paul Marcantoni

(57) ABSTRACT

A composition and a process for using the composition are disclosed. The composition comprises, or is produced from, a titanium chelate and an aluminum hydroxyhalide, in a solvent. A process comprises contacting a carbonyl compound, in the presence of a composition, with a glycol in which the composition comprises or is produced from a titanium chelate and an aluminum hydroxyhalide. The composite can be produced in the order of adding the aluminum hydroxyhalide to the titanium chelate in the solvent.

46 Claims, No Drawings

COMPOSITION COMPRISING TITANIUM AND ALUMINIUM AND POLYESTER PRODUCTION

FIELD OF THE INVENTION

The invention relates to a composition comprising titanium and aluminum and a process for producing polyesters such as polyalkylene terephthalates.

BACKGROUND OF THE INVENTION

Polyesters such as, for example, polyethylene terephthalate, polytrimethylene terephthalate and polybutylene terephthalate, generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol followed by polycondensation or by direct esterification of terephthalic acid with the selected glycol followed by polycondensation. A catalyst is used to catalyze the esterification, transesterification and/or polycondensation.

Antimony, in the form of a glycol solution of antimony oxide, frequently is used as catalyst in the transesterification or esterification process. However, antimony forms insoluble antimony complexes that plug fiber spinnerets and leads in fiber spinning to frequent shutdowns to wipe spinnerets clean of precipitated antimony compounds. The antimony-based catalysts are also coming under increased environmental pressure and regulatory control, especially in food contact applications.

Organic titanates, such as tetraisopropyl and tetra n-butyl titanates, are known to be effective polycondensation catalysts for producing polyalkylene terephthalates in general, and frequently are the catalyst of choice. However, these catalysts tend to hydrolyze on contact with water, forming glycol-insoluble oligomeric species that lose catalytic activity. These organic titanates may also generate a significant amount of yellow discoloration when used as polyesterification catalysts. Co-catalysts such as zinc, cobalt or manganese have been used with organic titanates to enhance catalyst activity or minimize color, but they still generate some yellow discoloration in the resulting polymer.

JP 2003 306538 and JP 2003 305537 disclose a process for preparing polyesters using as catalyst an aluminum compound, a phosphorus compound and optionally a metal compound selected from Sb, Ge, Ti, Co and Mg compounds. Also, JP 2000 143789 discloses a process for polyesters using as catalyst a titanium compound and a second compound selected from an Al, Ba, Co, Mg, Mn, Sr, Zn, and alkali metal compound, and/or a phosphorus compound.

There is a need for an improved catalyst composition to improve the color of polyethylene terephthalates while maintaining a high catalyst activity and reducing titanium catalyst requirements. Preferably, the catalyst composition is in the form of a stable solution.

SUMMARY OF THE INVENTION

The invention comprises a composition that comprises, or is produced from, a titanium compound and an aluminum compound.

The invention also comprises a process that comprises contacting a carbonyl compound and an alcohol in the presence of a composition comprising or produced from a titanium compound and an aluminum compound.

DETAILED DESCRIPTION OF THE INVENTION

The composition can be a catalyst composition useful as an esterification or polycondensation catalyst for producing esters or polyesters such as polyalkylene terephthalates. The composition can comprise or consist essentially of or consist of a solution or slurry of a titanium chelate hydroxycarboxylate compound and an aluminum hydroxyhalide compound in a solvent. The weight ratio of aluminum to titanium (element:element) can be about 1:1 to about 30:1, or about 2:1 to about 25:1, or about 5:1 to about 20:1.

One can use any titanium chelate for producing the composition. A number of such chelates can be commercially available from, for example, E. I. du Pont de Nemours and Company ("DuPont") of Wilmington Del., USA, or produced by any methods known to one skilled in the art. Examples of commercially available titanium chelates include, but are not limited to, acetylacetonate titanate chelate (TYZOR® AA), ethyl acetoacetate titanate chelate (TYZOR® DC), triethanolamine titanate (TYZOR® TE), and lactic acid titanate, ammonium salt (TYZOR® LA), all available from DuPont. The term "titanium chelate" can refer to a compound having the formula of $TiX_m(OR)_n$, where X is a radical derived from a chelating agent, m ranges from 0 and to 2 but not 0, and n ranges from 0 to 4; and R is independently a hydrocarbyl radical having about 1 to 20 carbon atoms which may be further substituted. A chelating agent can be a carbonyl compound or an alkanolamine. A carboxylic acid, a ketone, an ester, a ketoester, an aminocarboxylic acid, triethanolamine, or combinations of two or more thereof can be used to produce the titanium chelates. Examples of suitable hydroxycarboxylic acids include, but are not limited to, lactic acid, glycolic acid, citric acid, tartaric acid, malic acid, and combinations of two or more thereof. Preferably the hydroxycarboxylic acid is an α-hydroxycarboxylic acid, in which the hydrocarbyl group or alkyl group has 1 to about 15, preferably 1 to 10 carbon atoms per group such as, for example, lactic acid. Other chelating agents include ethanolamine, triethanolamine, 2,4-pentanedione, 1,4-hexanedione, 1,3-pentanedione, 2,4-hexanedione, dipivaloyl methane, dimethyl malonate, diethyl malonate, methyl acetoacetate, ethyl acetoacetate, isopropyl acetoacetate, butyl acetoacetate, and combinations of two or more thereof.

For example, a titanium hydroxycarboxylate can comprise, or be produced from, a tetraalkyl titanate and a hydroxycarboxylic acid. The tetraalkyl titanate can have a formula of $Ti(OR)_4$ where R is as disclosed above. Suitable tetraalkyl titanates include, but are not limited to, tetraethyl titanate, tetrapropyl titanate, tetraisopropyl titanate, tetrabutyl titanate, tetrahexyl titanate, tetraoctyl titanate, and combinations of two or more thereof. TYZOR® LA disclosed above is an example of titanium hydroxycarboxylate, which is an aqueous solution with about 50% active ingredient.

The aluminum compound suitable for use can be an aluminum halide such as aluminum hydroxyhalide compound. The frequently used aluminum halide is aluminum hydroxylchloride.

Aluminum hydroxylchlorides are also known as polyaluminum chlorides, aluminum chloride hydroxide, aluminum oxychloride, aluminum chlorohydrate, and basic aluminum chloride, among other names. The aluminum hydroxylchloride compound useful in this invention can be any aluminum or polyaluminum compound containing hydroxyl and chloride groups. Such compounds are readily available commercially from a variety of sources, typically as aqueous solutions, but also available in solid form and generally comprise about 5 to about 20 weight % of aluminum. An example of a commercially available aluminum hydroxylchloride is ULTRION 8187, available from the Nalco Company in Naperville, Ill. as a solution of specific gravity of 1.34 and an aluminum content of 11.9% by weight. This compound is hereinafter referred to as NALCO® 8187.

The composition can be in solution or slurry form in a solvent. Examples of solvent are water or an alcohol having the formula of $R^1(OH)$, an alkylene glycol of the formula (HO)A(OH), a polyalkylene glycol or alkoxylated alcohol having the formula of $R^1O[CH_2CH(R^2)O]_nH$, or combinations of two or more thereof in which each $R^1$ can be the same or different and is a hydrocarbyl radical having 1 to about 10 carbon atoms per radical. $R^2$ can be an alkyl radical or a hydrogen. "A" can be an alkylene radical having 2 to about 10 carbon atoms per molecule. The subscript n is a number in the range of from 1 about to about 10. Examples of solvents include, but are not limited to, water, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof.

The composition can be produced by any means known to one skilled in the art such as, for example, mixing the individual components together. The titanium compound and the aluminum compound are convenient available as aqueous solutions, and may be mixed as such. The catalyst composition can also be produced, in addition to water, in a second solvent that is compatible with or does not interfere with an esterification or transesterification or polycondensation reaction.

As examples, if the composition is used as a polycondensation catalyst for producing polyethylene terephthalate, the composition can be produced in ethylene glycol. If the catalyst composition is used for producing polybutylene terephthalate, the composition can be produced in 1,4-butanediol. If the catalyst composition is used for producing polypropylene terephthalate, the composition can be produced in 1,3-propylene glycol.

The mixing of ingredients can be carried out under an inert atmosphere, such as nitrogen, carbon dioxide, helium, or combinations of two or more thereof to avoid liberating a flammable alcohol, if an alcohol is present, because of the exothermic nature of the reaction. This step can be carried out at a temperature in the range of from about 0° C. to about 100° C., preferably about 20° C. to about 50° C. Generally any amount of solvent can be used as long as the amount can substantially dissolve the composition. Modest or vigorous agitation can be used during the mixing phase to avoid local concentrations.

Optionally, the composition can be used with a co-catalyst such as cobalt, zinc, zirconium, or a compound comprising one or more of these metals, and combinations of two or more thereof. For example, zinc acetate, zinc chloride, zinc nitrate, zinc sulfate, cobaltous acetate tetrahydrate, cobaltous nitrate, cobaltous chloride, cobalt acetylacetonate, cobalt naphthenate, cobalt hydroxide, cobalt salicyl salicylate, zirconium propoxide, zirconium butoxide, or combinations of two or more thereof can be uses as co-catalyst. The co-catalyst can be used separately from the solution or slurry composition.

Optionally, the composition can be used by adding separately with a catalyst modifier such as a phosphorus compound including phosphoric acid, phosphates, hypophosphorous acid or its salt, or phosphorus-containing ester. Phosphorus-containing ester refers to an ester containing phosphorus in the molecule and includes a phosphite ester containing no free P—OH groups. Such esters include a tris-phosphite ester or diphosphonite ester such as tris-alkyl and aryl phosphites or aryl diphosphonite esters including trimethyl phosphite; triethyl phosphite; tributyl phosphite; tri-isopropylphosphite; trisdodecyl phosphite; trinonyldecyl phosphite; triphenylphosphite; phosphorous acid, [1,1'-biphenyl]-4,4'-diylbis-tetrakis(2,4-bis(1,1-dimethylethyl)phenyl)ester; (tris-(2,4-di-t-butyl) phosphite; tri(ethylene glycol)phosphite; tri(propylene glycol)phosphite; tri(butylene glycol)phosphite; or combinations of two or more thereof. A phosphorus compound can be introduced to the composition before or during polycondensation stage. That is, it can be combined with other components and an oligomer as disclosed below.

The invention is also directed to a stable solution useful as a polycondensation catalyst for preparing polyesters such as polyalkylene terephthalates, the solution comprising the titanium hydroxycarboxylate compound or composition, the aluminum hydroxylchloride compound or composition, in the solvent disclosed above. Any ratio of aluminum compound to titanium compound disclosed above can be used.

The term "stable solution" means a solution remains solution without precipitation, or substantial precipitation, of any kind when stored at room temperature (about 25° C.) for at least a week, or even a month. To obtain a more stable solution, aluminum hydroxylchloride solution is added to titanium hydroxycarboxylate solution, rather than in the reverse order. Wishing not to be bound by theory, it is believed that the order may avoid a local over-concentration of some unspecified ingredient with resulting precipitate formation. Alternatively, the aluminum hydroxylchloride solution and the titanium hydroxycarboxylate solution can be added at the same time to the mixing vessel. Any method of obtaining a stable solution may be used.

The composition or composition together with optional co-catalysts and/or catalyst modifiers can be used for producing polyesters using any known melt or solid state techniques by promoting esterification, transesterification, polycondensation, or combinations thereof.

A process that can be used in, for example, the production of polyester is provided. The process comprises contacting, in the presence of a composition as disclosed above, a carbonyl compound, such as a difunctional carbonyl compound, with a glycol.

Any such carbonyl compound, which when combined with a glycol, can produce a polyester can be used. Generally, such carbonyl compounds include, but are not limited to, difunctional acids, esters, amides, acid anhydrides and acid halides, and salts of difunctional carboxylic acid oligomers or polymers having repeat units derived from a difunctional acid, or combinations of two or more thereof. An example of difunctional acid is a difunctional carboxylic acid or salt or ester thereof.

An example process for producing polyester comprises, consists essentially of, or consists of contacting a reaction medium with a composition disclosed above in the first embodiment of the invention. The reaction medium can comprise, consist essentially of, or consist of a glycol and either (1) a organic acid, a salt thereof, an ester thereof, or combinations thereof or (2) an oligomer having repeat units derived from a organic acid or ester.

Examples of suitable organic acids include, but are not limited to, terephthalic acid, isophthalic acid, napthalic acid, succinic acid, adipic acid, phthalic acid, glutaric acid, oxalic acid, maleic acid, and combinations of two or more thereof. Examples of suitable esters include, but are not limited to, dimethyl adipate, dimethyl phthalate, dimethyl terephthalate, dimethyl glutarate, and combinations of two or more thereof.

Examples of carboxylic acid metal salts or esters thereof includes a 5-sulfo isophthalate metal salt and its ester having the formula of $(R^3O_2C)_2ArS(O)_2OM^1$ in which each $R^3$ can be the same or different and is hydrogen or an alkyl group containing 1 to about 6, or 2, carbon atoms. Ar is a phenylene group. $M^1$ can be an alkali metal ion such as sodium. An example of the ester is bis-glycolate ester of 5-sulfo isophthalate sodium salt.

Any glycol that can esterify a difunctional carbonyl compound to produce polyester can be used in the present invention. Examples of suitable glycols include, but are not limited to, ethylene glycol, propylene glycol, isopropylene glycol, butylene glycol, 1-methyl propylene glycol, pentylene glycol, diethylene glycol, triethylene glycol, and combinations of two or more thereof.

The contacting of the carbonyl compound and glycol can be carried out by any suitable means. For example, the carbonyl compound and glycol can be combined before being contacted with the catalyst. The catalyst can be dispersed in a glycol by any suitable means such as mechanical mixing or stirring to produce a dispersion followed by combining the dispersion with (1) the carbonyl compound and (2) a glycol under a condition sufficient to effect the production of a polyester.

An oligomer can have a total of about 1 to about 100, or about 2 to about 10 repeat units derived from a carbonyl compound and alcohol.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the glycol to carbonyl compound can be any ratio so long as the ratio can effect the production of a polyester. Generally the ratio can be in the range of from about 1:1 to about 10:1, or about 1:1 to about 5:1, or 1:1 to 4:1.

The catalyst, expressed as Ti, can be present in the range of about 0.0001 to about 50,000, or about 0.001 to about 10,000, or 0.001 to 1000 ppmw (parts per million by weight) of the medium comprising carbonyl compound and glycol. A co-catalyst disclosed above, if used, can also be present in the same range (expressed as Zr, Zn, or Co). Other ingredients such as conventional esterification and transesterification catalysts (e.g., manganese) and those enhancing catalyst stability or performance may be introduced to the production process concurrent with, or following, introduction of the composition disclosed herein.

The following Examples are provided to further illustrate the invention and are not to be construed as to unduly limit the scope of the invention. All TYZOR® products were obtained from DuPont disclosed above.

EXAMPLES

A 1-liter resin kettle was provided with a Jiffy Mixer agitator rotating at 40 rpm (revolution per minute), a thermocouple, condenser and nitrogen sweep. All of the individual catalyst ingredients shown in Table 1 were added, along with 115 ml of ethylene glycol, and 400 g of terephthalic acid oligomer (TPA oligomer, produced by the process disclosed in U.S. Pat. No. 6,066,714, column 8, line 5-22, the entire disclosure of the U.S. patent is incorporated herein by reference). The agitator was turned on and the temperature increased to 275° C. over a period of about 2.5 hours. The contents were polymerized by holding under agitation at 275° C. and a pressure of 120 mm Hg for 20 minutes, and at 280° C. and a pressure of 30 mm Hg for an additional 20 minutes. The contents were then held under agitation at 285° C. at 1 to 2 mm Hg pressure for a time sufficient to reach 15 ounce-inch (0.106 Newton-meter) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the color as measured spectrophotometrically are given in the tables below.

Color of the resulting polymer was measured in terms of the L-value and b-value, using an instrument such as SP-78 Spectrophotometer. The L-value shows brightness, with the greater the numerical value showing higher (desirable) brightness. A value of 78 or more would be considered good. The b-value shows the degree of yellowness, with a higher numerical value showing a higher (undesirable) degree of yellowness. Generally a b-value below 7 can be considered good. The a-value represents degree of redness: a higher positive a-value is redder; a lower negative a-value is greener.

The ppm (parts per million) concentrations in the tables below represent the weight concentration of the metals listed, in relation to the weight of polyester.

Comparative Example 1

This is an antimony reference example using 0.2028 g of antimony glycolate (56.7% Sb), 0.0882 g of cobalt acetate tetrahydrate, which was added as slurry in 5 ml of ethylene glycol. Phosphoric acid was added as a 10% solution (0.31 g).

Comparative Example 2

This example used 0.042 g NALCO® 8187 (11.9% Al) and 0.034 g of cobalt acetate tetrahydrate added as a solution in 5 ml of water, in place of the antimony glycolate. Phosphoric acid was added as a 10% solution (0.19 g).

Comparative Examples 3

This example used 0.2101 g of NALCO® 8187 added as a solution in 5 ml of water.

Comparative Examples 4

This example used 0.4202 g of NALCO® 8187 added as a solution in 5 ml of water.

Comparative Example 5

This example used 0.061 g of TYZOR® LA (titanium bis-ammonium lactate containing 8.2% Ti) added as a solution in 5 ml of water.

Comparative Example 6

An aqueous mixture of aluminum and titanium catalyst was prepared by adding 12.05 g of TYZOR® LA to 12.6 g of NALCO® 8187 solution. A sample of this catalyst (0.124 g) was dissolved in 5 ml of water and added to the ethylene glycol, and terephthalic acid oligomer and the polymerization was carried out as disclosed above.

Example 1

An aqueous catalyst was prepared by adding 6.02 g of TYZOR® LA to 84.03 g of NALCO® 8187 solution (11.9% Al). A sample of this catalyst (0.4507 g) was dissolved in 5 ml of water and added to the ethylene glycol, and terephthalic acid oligomer and the polymerization was carried out as disclosed above.

Example 2

An aqueous catalyst was prepared by adding 12.05 g of TYZOR® LA to 21.01 g of NALCO® 8187 solution. A sample of this catalyst (0.166 g) was dissolved in 5 ml of water and added to the ethylene glycol, and terephthalic acid oligomer and the polymerization was carried out as disclosed above.

The results are shown in Table 1.

TABLE 1

| Example | Metals* (ppm) | Time (min) | L-value | a-value | b-value |
| --- | --- | --- | --- | --- | --- |
| Comp. Ex.1 | Sb/Co/P (230/42/19) | 75 | 73.79 | −1.74 | 5.03 |
| Comp. Ex.2 | Al/Co/P (9.7/16/12) | 195 | 76.77 | −0.84 | 4.04 |
| Comp. Ex.3 | Al (50) | 180+ | 85.28 | −0.5 | 3.95 |
| Comp. Ex.4 | Al (100) | 130 | 82.08 | −2.9 | 5.12 |
| Comp. Ex.5 | Ti (10) | 65 | 79.72 | −1.83 | 7.83 |
| Comp. Ex.6 | Ti/Al (10/15) | 105 | 83.33 | −1.41 | 7.33 |
| Ex.1 | Ti/Al (5/100) | 105 | 83.59 | −0.9 | 5.93 |
| Ex.2 | Ti/Al (10/25) | 90 | 82.33 | −1.39 | 6.34 |

*Cobalt was added as a solution of cobalt acetate in 5 ml water. Phosphorous was added as a 10% aqueous solution of phosphoric acid.

Result of Comparative Example 1 was use for comparison purposes. Comparative Example 2 using NALCO® 8187 in place of the antimony oxide gave a product satisfactory in color but much too slow in reaction. Comparative Examples 3 and 4 using only NALCO® 8187 gave excellent color performance, but the catalyst activity was much too slow. Comparative Example 5 using TYZOR® LA had satisfactory activity, but gave a product with a b value above 7. In Comparative Example 6, the ratio of Al/Ti was outside the limit of the invention and gave polymer with b color outside the limits of 7.

Example 1, the Al/Ti ratio was within the limits of the invention, shows polymer having acceptable b color (<7). Similar result is shown in Example 2.

Example 3

An aqueous catalyst was prepared by adding 12.05 g TYZOR® LA to 42.02 g NALCO® 8187 solution. A sample of this catalyst (0.2711 g) was dissolved in 5 ml of water and added to the ethylene glycol and terephthalic acid oligomer. A phosphorous stabilizer was added as 10% phosphoric acid (0.158 g). The polymerization was carried out as above.

Example 4

An aqueous catalyst was prepared by adding 6.025 g of TYZOR® LA to 58.86 g NALCO® 8187 solution. A sample of this catalyst (0.3246 g) was dissolved in 5 ml of water and added to the ethylene glycol, and terephthalic acid oligomer. A phosphorous stabilizer was added as 10% phosphoric acid (0.158 g). The polymerization was carried out as above.

Example 5

This example was the same as Example 3 except that 0.0443 g of cobalt aceate tetrahydrate was added as a solution in 5 ml of water as noted in Table 2.

Example 6

This example was the same as Example 4 except that 0.0221 g of cobalt acetate tetrahydrate was added as a solution in 5 ml of water as noted in Table 2. Phosphoric acid was added as a 10% solution in water (0.079 g).

Example 7

An aqueous catalyst was prepared by adding 12.05 g TYZOR® LA to 58.86 g NALCO® 8187 solution. A sample of this catalyst (0.3551 g) and 0.0443 g of cobalt acetate tetrahydrate was dissolved in 5 ml of water and added to the ethylene glycol and terephthalic acid oligomer. A phosphorous stabilizer was added as 10% phosphoric acid (0.158 g). The polymerization was carried out as above.

Example 8

The example was the same as Example 4 except 0.0886 g of cobalt acetate tetrahydrate and 0.301 g of 10% phosphoric acid solution was used.

TABLE 2

| Example | Metals (ppm) | Time (min) | L-value | a-value | b-value |
| --- | --- | --- | --- | --- | --- |
| 3 | TI/Al/P (10/50/10) | 90 | 79.03 | −1.58 | 4.57 |
| 4 | Ti/Al/P (5/70/10) | 135 | 82.04 | −0.99 | 5.12 |
| 5 | Ti/Al/Co/P (10/50/21/10) | 60 | 77.44 | −1.2 | 3.97 |
| 6 | TI/Al/Co/P (5/70/10/5) | 110 | 81.27 | −0.99 | 4.25 |
| 7 | TI/Al/Co/P (10/70/21/10) | 80 | 78.3 | −1.48 | 5.37 |
| 8 | TI/Al/Co/P (5/70/42/19) | 50 | 74.41 | −1.54 | 4.37 |

Table 2 shows that by proper selection of cobalt toner and phosphorous stabilizer one can improve b color performance of the titanium/aluminum catalyst solution without impacting catalyst activity. Example 4 polymerized at a faster rate than example 2, and had improved b color. Examples 5 and 7 polymerized faster than example 3 and had improved b color.

Examples 9 to 11

Table 3 shows the effect of adding the TYZOR® LA and NALCO® 8187 solution in different orders. The amounts listed are shown as grams of solution.

TABLE 3

| Example | Mixing Procedure | TYZOR® LA | NALCO® 8187 | Appearance |
|---|---|---|---|---|
| 9 | TYZOR® LA added to NALCO® 8187 solution | 3.1 | 29.4 | Precipitate |
| 10 | NALCO® 8187 solution added to TYZOR® LA | 3.1 | 29.4 | Solution |
| 11 | NALCO® 8187 solution added to TYZOR® LA | 3.1 | 10.5 | Solution |

When the aluminum hydroxylchloride composition (NALCO® 8187) was added to the TYZOR® LA (titanium bis-ammonium lactate) composition with stirring (Examples 10 and 11), a clear pale yellow solution was formed, which did not form a precipitate on storage for over 30 days. If TYZOR® LA was added to the NALCO® 8187 solution (Example 9) however, a precipitate formed immediately. While the slurry so formed was effective as a catalyst, it would not be suitable for shipping and marketing purposes.

What is claimed is:

1. A composition comprising, or produced from, a titanium chelate and an aluminum hydroxyhalide, in water or an alcohol or both wherein the weight ratio of aluminum to titanium is in the range of from about 2:1 to about 25:1.

2. A composition according to claim 1 wherein said titanium chelate is a titanium hydroxycarboxylate.

3. A composition according to claim 1 wherein said titanium hydroxycarboxylate comprises, or is produced from, a tetraalkyl titanate and a hydroxycarboxylic acid.

4. A composition according to claim 3 wherein said tetraalkyl titanate is $Ti(OR)_4$ in which R is as is a hydrocarbyl radical having 1 to about 20 carbon atoms.

5. A composition according to claim 4 wherein said tetraalkyl titanate is tetraethyl titanate, tetrapropyl titanate, tetraisopropyl titanate, tetrabutyl titanate, tetrahexyl titanate, tetraoctyl titanate, or combinations of two or more thereof.

6. A composition according to claim 4 wherein said tetraalkyl titanate is tetraisopropyl titanate.

7. A composition according to claim 3 wherein said hydroxycarboxylic acid is an α-hydroxycarboxylate.

8. A composition according to claim 4 wherein said hydroxycarboxylic acid is lactic acid, glycolic acid, citric acid, tartaric acid, malic acid, or combinations of two or more thereof.

9. A composition according to claim 5 wherein said hydroxycarboxylic acid is lactic acid, glycolic acid, citric acid, tartaric acid, malic acid, and combinations of two or more thereof.

10. A composition according to claim 6 wherein said hydroxycarboxylic acid is lactic acid.

11. A composition according to claim 1 wherein said titanium chelate is lactic acid titanate, ammonium salt.

12. A composition according to claim 1 wherein said aluminum hydroxyhalide is aluminum hydroxylchloride.

13. A composition according to claim 11 wherein said aluminum hydroxyhalide is aluminum hydroxylchloride.

14. A composition according to claim 12 wherein said aluminum hydroxylchloride has aluminum content of about 5 to about 20 by weight.

15. A composition according to claim 13 wherein said aluminum hydroxylchloride has aluminum content of about 5 to about 20 by weight.

16. A composition according to claim 1 wherein the weight ratio of aluminum to titanium is in the range of from about 5:1 to about 20:1.

17. A composition according to claim 13 wherein the weight ratio of aluminum to titanium is in the range of from about 5:1 to about 20:1.

18. A composition according to claim 15 wherein the weight ratio of aluminum to titanium is in the range of from about 5:1 to about 20:1.

19. A process to produce a polyester comprising contacting a carbonyl compound and an alcohol in the presence of a composition produced from a titanium chelate and an aluminum hydroxyhalide, in water or an alcohol or both wherein the weight ratio of aluminum to titanium is in the range of from about 2:1 to about 25:1.

20. A process according to claim 19 wherein said titanium chelate is titanium bis-ammonium lactate and said aluminum hydroxyhalide is aluminum hydroxylchloride.

21. A process according to claim 20 wherein said aluminum hydroxylchloride has aluminum content of about 5 to about 20 by weight and wherein the weight ratio of aluminum to titanium is in the range of from about 5:1 to about 20:1.

22. A process according to claim 19 wherein said composition is a solution or slurry composition produced from a titanium chelate which is titanium hydroxycarboxylate and an aluminum hydroxyhalide which is aluminum hydroxyhalide, in water or an alcohol wherein the ratio of Al:Ti is about 2:1 to about 25:1.

23. A process according to claim 19 wherein said titanium chelate is titanium bis-ammonium lactate; said aluminum hydroxyhalide has aluminum content of about 5 to about 20 by weight; and the weight ratio of aluminum to titanium is in the range of from about 5:1 to about 20:1.

24. A process according to claim 19 wherein said carbonyl compound is an organic acid and said glycol is ethylene glycol.

25. A process according to claim 19 wherein said carbonyl compound is an terephthalic acid, dimethyl terephthalate, or both.

26. A process according to claim 21 wherein said carbonyl compound is an terephthalic acid, dimethyl terephthalate, or both.

27. A process according to claim 22 wherein said carbonyl compound is an terephthalic acid, dimethyl terephthalate, or both.

28. A process according to claim 23 wherein said carbonyl compound is an terephthalic acid, dimethyl terephthalate, or both.

29. A process according to 25 wherein said composition further comprises a phosphorus compound, a cobalt compound, or both.

30. A process according to claim 26 wherein said composition further comprises a phosphorus compound, a cobalt compound, or both.

31. A process according to claim 27 wherein said composition further comprises a phosphorus compound, a cobalt compound, or both.

32. A process according to claim 28 wherein said composition further comprises a phosphorus compound, a cobalt compound, or both.

33. A process according to 30 wherein said phosphorus compound is phosphoric acid and said cobalt compound is cobalt acetate.

34. A process to prepare a solution or slurry composition comprising adding an aluminum hydroxyhalide which is aluminum hydroxylchloride, to a titanium chelate which is titanium hydroxycarboxylate, in water or an alcohol wherein the weight ratio of aluminum to titanium is in the range of from about 2:1 to about 25:1.

35. A process according to claim 34 wherein said titanium chelate comprises, or is produced from, a tetraalkyl titanate and a hydroxycarboxylic acid.

36. A process according to claim 35 wherein said tetraalkyl titanate is tetraethyl titanate, tetrapropyl titanate, tetraisopropyl titanate, tetrabutyl titanate, tetrahexyl titanate, tetraoctyl titanate, or combinations of two or more thereof.

37. A process according to claim 34 wherein said tetraalkyl titanate is tetraisopropyl titanate.

38. A process according to claim 35 wherein said hydroxycarboxylic acid is lactic acid, glycolic acid, citric acid, tartaric acid, malic acid, or combinations of two or more thereof.

39. A process according to claim 36 wherein said hydroxycarboxylic acid is lactic acid, glycolic acid, citric acid, tartaric acid, malic acid, and combinations of two or more thereof.

40. A process according to claim 37 wherein said hydroxycarboxylic acid is lactic acid.

41. A process according to claim 34 wherein said titanium chelate is lactic acid titanate, ammonium salt.

42. A process according to claim 34 wherein said aluminum hydroxyhalide has aluminum content of about 5 to about 20 by weight.

43. A process according to claim 40 wherein said aluminum hydroxyhalide has aluminum content of about 5 to about 20 by weight.

44. A process according to claim 41 wherein said aluminum hydroxyhalide has aluminum content of about 5 to about 20 by weight.

45. A process according to claim 34 wherein the weight ratio of aluminum to titanium is in the range of from about 5:1 to about 20:1.

46. A process according to claim 44 wherein the weight ratio of aluminum to titanium is in the range of from about 5:1 to about 20:1.

* * * * *